Nov. 28, 1961 W. L. CAREL 3,010,222
CONTACT FLIGHT DISPLAY
Filed June 16, 1959 3 Sheets-Sheet 1

Inventor:
Walter L. Carel,
by *Allen E. Amgott*
His Attorney.

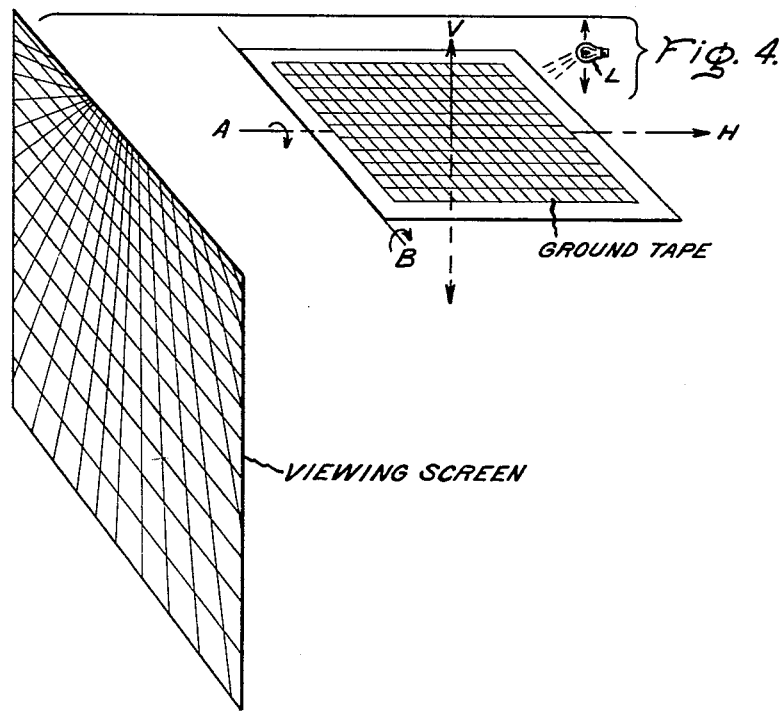
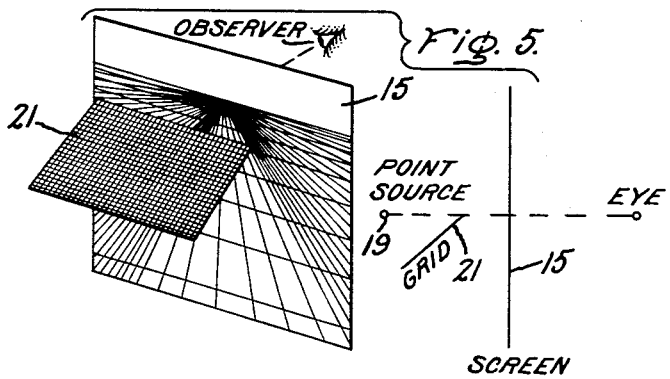
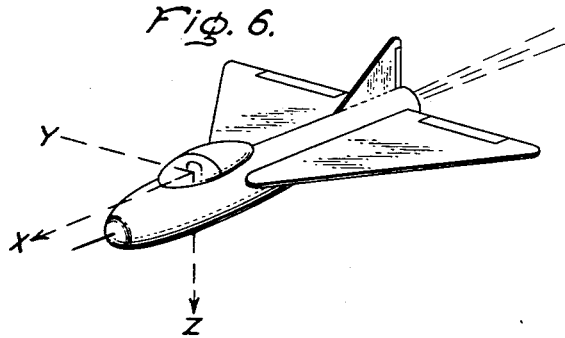

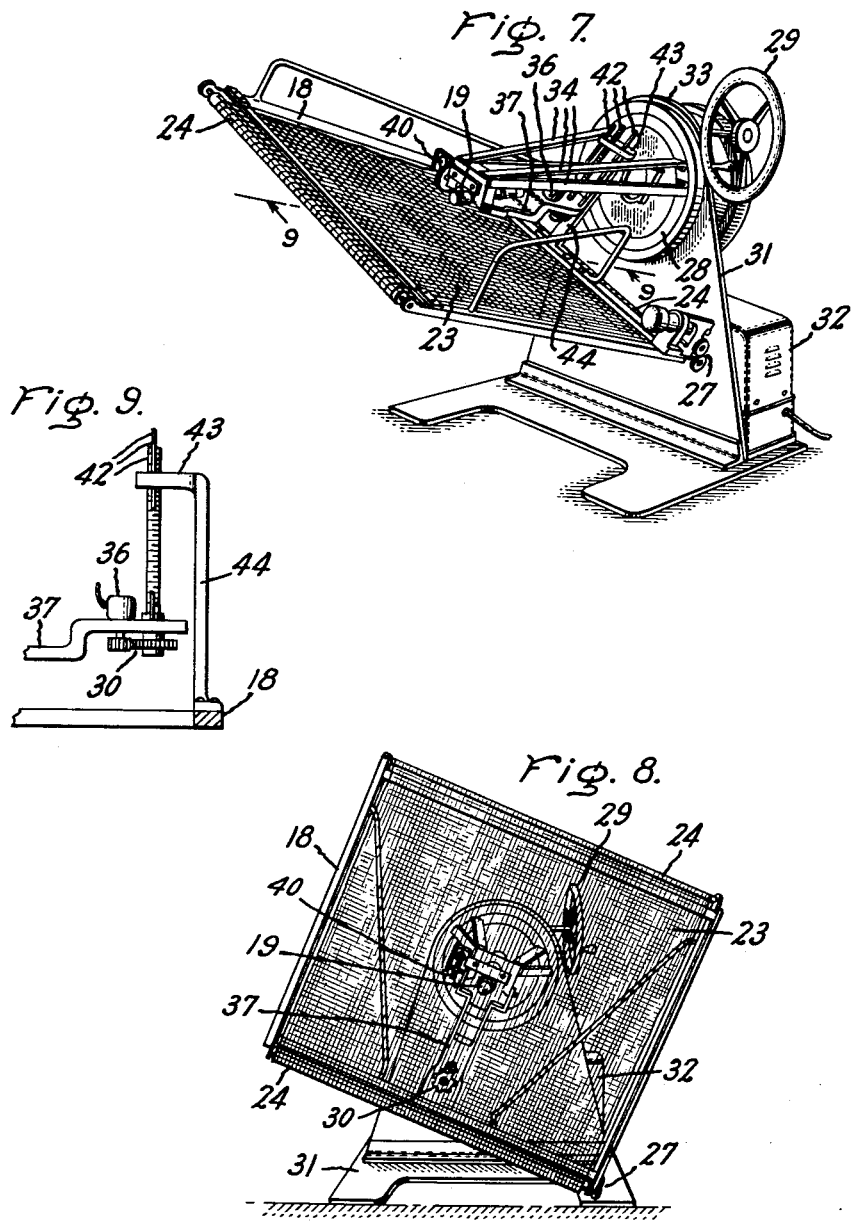

United States Patent Office 3,010,222
Patented Nov. 28, 1961

3,010,222
CONTACT FLIGHT DISPLAY
Walter L. Carel, Ithaca, N.Y., assignor to General
Electric Company, a corporation of New York
Filed June 16, 1959, Ser. No. 820,747
1 Claim. (Cl. 35—12)

The present invention relates to method and means for visually displaying to the pilot in high performance aircraft a composite picture representative of the data on various instruments contained within the cockpit of the aircraft, and more particularly to means and apparatus for recreating by artificial techniques three-dimensional flight information on a two-dimensional surface.

During contact flight the pilot has for information both the gauges and a direct view of the extra-cockpit environment. During instrument flight he has only gauges. It has been reported by pilots that instrument flight is much more difficult than visual contact flight. This difficulty is due both to the absence of the normal visual environment and to a basic display inadequacy in current instrument panels. The combined result is that undue interruption and integration are required of the pilot which, in turn, leads to errors, disorientation, accidents, aborted missions and unhappiness.

At the present time there are four major factors contributing to display inadequacy within an aircraft:

(1) Display configuration and structure—the way it looks;

(2) Display movement characteristics—the direction or moving elements of the display;

(3) Display time response characteristics—instrument lags, etc.; and, (4) Display or instrument unreliabilities.

In contact flight, the "display" is the world around the pilot. The configuration and movement characteristics are visible; there are no "instrument" lags and no "display" unreliabilities. If the assumption is made that contact flight represents the optimum condition for flight control and orientation, it would be desirable to be able to present artificially to the pilot by reproduction in the cockpit the conditions necessary to create the impression of contact flight. For the case of visual perception, this means displaying the relevant parameters or visual "cues" to assist the pilot.

Successful contact flight is dependent upon correct orientation to a surface—usually the earth's surface or a cloud layer. Perception of a surface and subsequent orientation to it is dependent upon the fact that surface texture elements are above the acuity threshold. Therefore, any artificially generated display aimed towards creating the perception of three-dimensional space should be a display which will lead to the essential optical stimuli, that is, the type of pattern produced by a textured "earth's" surface. A preferable type display should include a textured surface composed of regular, geometric, achromatic and opaque figures. In addition to textured surface in the display, the presence of a visible horizon makes for better orientation discriminations. Thus, "cues," that is, textured surface and visible horizon, establish necessary and sufficient conditions for at least two static aspects of orientation, namely, (1) body (or aircraft) position with respect to the earth's surface, and (2) direction and ordinal position of objects in the visual world.

In addition, attention is directed to visual aids concerning the direction and speed of locomotion. If an observer be considered as moving through space in normal contact flight, the presence of textured earth's surface gives rise to certain motions in the visual field of the observer, that is, the pattern of the optical stimuli is transformed. These optical motions of "objects" are geometrically universal for any locomotion over the surface; flying is only a particular. They are universal in the sense that the vectors follow geometric principles and are not changed by the nature of the specific objects on the surface. Thus, a contact display in addition to generating the previous noted views should generate these motion perspectives.

In order to provide proper orientation for a pilot, adequate perception of the body or aircraft's position with respect to the earth's surface, adequate perception of direction of locomotion, adequate perception of speed of locomotion, and adequate perception of direction and ordinal position of objects in the visible world must be taken into account. Thus, there are certain requirements which the contact or visual flight should include, namely, a textured surface; a horizon; and motion perspective. Accordingly, it is an object of the present invention to provide a method of visually displaying simulated flight information via textured surface, horizon, and motion perspective on a two-dimensional surface.

Another object of the invention is to provide method and apparatus for generating a simulated flight display including translational and rotational degrees of freedom on a translucent viewing screen.

A further object of the invention is to provide a method and means for simulating a three-dimensional display which includes roll, pitch, velocity, altitude, flight path, etc. information; in short, any information inherent in the contact flight display which a pilot has available to him.

Still another object of the present invention is to recreate by artificial techniques on a screen an artificial display which utilizes the effective psycho-physical capabilities of the human pilot.

Other objects and many of the attendant advantages of the invention will be readily appreciated as the same becomes better understood by reference to the detailed description when considered in connection with the drawings in which:

FIGURE 4 illustrates the principle of a device for generating a display in perspective onto a frosted viewing screen;

FIGURE 5 is a pictorial representation illustrating the principle of operation of the shadowgraph technique;

FIGURE 6 is a pictorial representation showing the movements of an aircraft that may be displayed on the screen of FIGURE 4;

FIGURES 7 and 8 illustrate pictorially two views of one embodiment of apparatus used to generate a simulated flight display; and, FIGURE 9 is an enlarged cross-sectional view of a portion of the apparatus taken along lines 9—9 of FIGURE 7.

As mentioned hereinbefore, instrument flight in high speed single place aircraft is reputed to be very difficult. This is in part due to the nature of the instrument displays which present separate pieces of information requiring complex integration on the part of the pilot. In brief, applicant's invention provides method and means for visually displaying, artificially, three-dimensional flight information on a two-dimensional surface simulating contact flight. Based on perceptual theory, an appropriate selection of display elements is made which creates two parallel surfaces; a ground plane and sky cover which leads to the impression of three coordinate space and locomotion over the ground surface.

Figure 1:
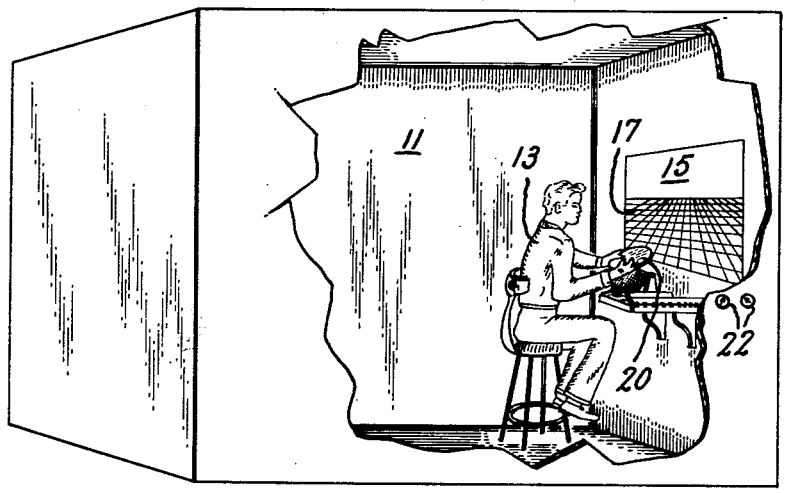
FIGURE 1 is a pictorial view of a "trainer" incorporating the invention in one mode of operation.

In FIGURE 1 there is illustrated pictorially a darkened room 11 in which an observer 13 is seated facing a viewing screen 15 on which a picture 17 is presented. The viewing screen 15 can be of the ground-glass type on which picture 17 is projected. Various presentations may be projected onto the screen 15 to determine the subject or the observer's reaction to these presentations. The reactions of the observer provide psycho-physical data usable as the basis for the design of a display analog utilizing the optimum ranges of human sensitivity. In short, the information gathered from the experimental results can be used to specify desired display characteristics of a contact analog flight instrument.

Figure 2:
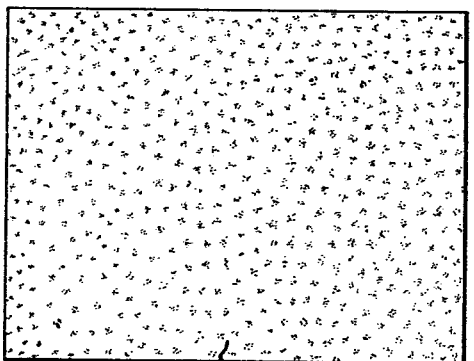
FIGURE 2 and 3 are pictorial representations of several textures etched on a transparent tape used for projection onto a translucent viewing screen.
Figure 3:
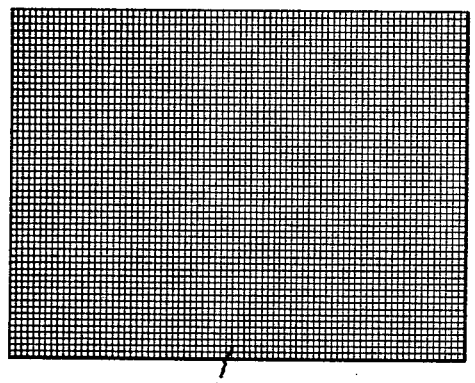

In one embodiment of this invention a shadowgraph technique was employed in which the picture 17, illustrated on screen 15, is generated from the rear of the screen. The ground in two embodiments consisted of a transparent tape 16 containing either a checkerboard or random dot texture or grid (see FIGURES 2 and 3). This tape is situated between the picture plane and a point source of light and is oriented so that it will define a plane parallel to the represented surface or real ground. To represent zero pitch, the ground is perpendicular to the plane picture.

In FIGURE 4 there is shown in pictorial view the principle of operation of the shadowgraph technique. The ground has two degrees of freedom of rotation and two of translation. Thus, it will rotate about an axis designated by the letter A for roll, and about an axis B for pitch. In addition, the entire assembly will move in a vertical dimension as indicated by the letter V in order to accomplish displacement of the surface which occurs in a change of altitude. The horizontal component of velocity is obtained by moving the ground away from the screen in the direction indicated by H. The vertical component of velocity is generated by moving the light source L perpendicular to the ground in the same sense as the representative altitude change. Thus, any flight path can be simulated by the proper relation between the speeds of the ground tape and the light L. In addition, in order to maintain the correct picture the light can be caused to move with the ground in pitch.

All of the elements are positioned manually and their positions displayed on calibrated indicators except for the translational movement V of the ground tape and the vertical movement of the light source L. These movements are rate controlled.

The subject or observer 13 may have one of several reporting devices. One device comprises a flat disc approximately 12 inches in diameter mounted on a two-way gimbal system 20 (FIGURE 1) with two degrees of rotational freedom about axes in the horizontal plane. The rotation about these axes are geared to calibrate indicators 22 external to the observer's room and calibrated in degrees of pitch and roll. This disc is placed in front of the seated observer 13. The observer moves the disc to a position parallel to the slant of the surface represented by the perspective picture 17. A second recording device comprises a pencil light tube (not shown) mounted on the same two-way gimbal system mentioned hereinbefore. The observer is required to point in the direction of flight (point of impact). Calibrated dials indicate the point of intersection of the light beam with the screen. The third device is simply a "stick" with two degrees of freedom mounted in a normal position. Movements right-left and fore-aft are monitored by the experimenters. The stick does not control the picture but merely indicates the initial reaction to some particular flight condition as presented by the picture. The stick activates appropriate micro-switches as it is moved to "correct" the picture.

In one embodiment of the invention there is utilized a point source of light, a transparent tape, and a translucent viewing screen, together with a mechanical system to move the tape appropriately. The apparatus for generating the flight display will be more fully disclosed when considered in conjunction with FIGURES 5 and FIGURES 7, 8 and 9.

In FIGURE 5 there is illustrated in pictorial view the principle of operation of the device of FIGURES 7, 8 and 9. A point source of light 19, such as a 25 watt zirconium concentrated arc lamp, illuminates a transparent surface etched with a suitable grid structure 21 and casts a shadow of the structure in perspective onto a frosted viewing screen 15. When the screen 15 is viewed from the correct station point by an observer (the same distance behind the screen as the light source is in front of it) the picture is seen as identical with the picture that would be seen if a real surface, stretching out in front of and below the observer were viewed through a transparent window. Movement of the artificial surface will not lose the identity, and the impression of horizontal and vertical flight in all aircraft attitudes can be simulated.

The apparatus of FIGURES 7, 8 and 9 is capable of simulating the following aircraft movements: any transverse movements in the plane of symmetry defined in the aircraft's X and Z axis as shown in FIGURE 6; roll about the X axis pitch around the Y axis. The correct "distortions" of the picture corresponding to these aircraft maneuvers are accomplished by the following motions of the generating surface:

(1) Along the X axis—a continuous tape is pulled past the light at any desired speed;

(2) Along the Z axis—the entire tape mechanism is moved toward and away from the light at any desired speed (perpendicular to the plane of the tape). It is to be observed that any flight path in the X—Z plane can be obtained by supplying the correct components of velocity along the two axes.

(3) Roll around the X axis—the entire mechanism is rotated around the horizontal line between the light and the station point; and (4) Pitch around the Y axis—the entire tape and vertical movement mechanism is pivotable about an axis perpendicular to the longitudinal axis of the light.

In addition to the information and data projected on the viewing screen, additional data can be painted on the display by creating a visual surface corresponding to any desired flight path. Glide slope, localize beam, program altitude, etc. can all be displayed by creating a visible path along which the pilot would fly. The problems of vertical flight and aerobatics can also be partially solved by utilizing two surfaces; one representing the ground plane and the other the sky cover.

In FIGURES 7, 8 and 9 three is shown one embodiment of an apparatus capable of projecting on a viewing screen the desired display. As shown therein, the apparatus includes a support member 31 on which there is mounted a power supply 32. The vertical portion of support member 31 contains a circular housing 33 which circumscribes a roll ring 28. Said roll ring is capable of rotational motion within housing 33 and is rotated by means of drive wheel 29 which is suitably connected to ring 28 by means of appropriate gearing (not shown).

Attached to roll ring 28 is a structural mount 34. An angle bracket 37 is pivotally secured at one end to structural mount 34. A light source 19 is suitably mounted on one end of angle bracket 37. Power is supplied to light source 19 by means of appropriate cabling not shown.

A carriage 18 comprises a framed transparent tape 23 and a pair of "take-up" tape spools 24. One end of a bracket 44 is fixably secured to an edge of carriage 18. Also mounted on carriage 18 is a velocity drive mechanism including gearing 27 and a motor which rotates one of the spools 24, thereby causing the tape 23 having a checker-board texture etched thereon to be pulled across the carriage frame and past light source 19 at any desired rate of speed.

An altitude drive mechanism comprising a gearing 30 and motor 36, three vertical rods 42, the center one of which is threaded in guide stiffening bar 43, the other end of bracket 44, permits carriage 18 to be moved toward or away from light source 19. The lower ends of the outer rods 42 are secured to angle bracket 37. Upper ends of rods 42 are free to reciprocate within holes in stiffening bar 43. The outer two vertical rods act as guide rods. Gearing 30 and motor 36 are suitably secured to bracket 37 and cause carriage 18 to move toward or away from light source 19 by driving the threaded rod 42.

Carriage 18 is caused to be rotated about a horizontal line between light source 19 and the axis of roll ring 28 by means of drive wheel 29. A worm gearing 40 driven by a motor (not shown) affixed to structural mount 34 permits carriage 18 to be pivotable about an axis perpendicular to the longitudinal axis of light source 19. This pivotable movement of carriage 18 simulates the pitch of an aircraft.

The apparatus as shown in FIGURES 7, 8 and 9 is capable of simulating the aircraft movements shown in FIGURE 6 and described hereinbefore. By means of this apparatus, roll, pitch, forward velocity and vertical movement of an aircraft can be projected as a three-dimensional display on a translucent viewing screen.

While particular embodiments of the invention have been shown and described herein, it is not intended that the invention be limited to such disclosure but that changes and modifications can be made and incorporated within the scope of the claim.

What is claimed is:

Apparatus for simulating a view which is perceivable by a human observer to be three dimensional in that the view appears to be in a field of view definable by three mutually perpendicular axes; namely, an X-axis, a Y-axis and a Z-axis; said apparatus comprising: a transparent tape having a suitable reference configuration etched thereon; a tape-drive mechanism including a drive spool spaced apart from a take-up spool for enabling the tape to be transferred at variable speeds along the X-axis from the drive spool to the take-up spool; a source of illumination; a translucent viewing screen, the etched tape being run by a tape-drive mechanism between the illumination source and the viewing screen so that the shadow of the etched configuration is projected on the viewing screen; separate means coupled with the tape-drive mechanism for moving said mechanism and tape, at variable speeds, along the Z-axis toward, or away from, the illumination source; and, additional means coupled with the tape-drive mechanism for causing rotational motion, at variable speeds, of the tape about either, or both, the X-axis and the Y-axis.

References Cited in the file of this patent

UNITED STATES PATENTS

| | | |
|---|---|---|
| 2,352,101 | Hutter | June 20, 1944 |
| 2,650,517 | Falk | Sept. 1, 1953 |
| 2,711,593 | Lewis et al. | June 28, 1955 |
| 2,839,840 | Hemstreet | June 24, 1958 |
| 2,958,141 | Dorand | Nov. 1, 1960 |

FOREIGN PATENTS

| | | |
|---|---|---|
| 577,566 | Great Britain | May 23, 1946 |